United States Patent

Noumaru et al.

[11] Patent Number: 5,930,460
[45] Date of Patent: Jul. 27, 1999

[54] TEACHING PROGRAM AUTOMATIC GENERATION APPARATUS

[75] Inventors: Minoru Noumaru, Yokohama; Tatsuo Echizenya, Zama; Sinichi Watanabe, Yokohama; Mitsuhiko Uchida, Kawasaki, all of Japan

[73] Assignee: Nissan Motor Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/589,906

[22] Filed: Jan. 23, 1996

[30] Foreign Application Priority Data

Jan. 24, 1995 [JP] Japan ................................. 7-009150

[51] Int. Cl.⁶ .................................................. G06F 15/46
[52] U.S. Cl. ............................... 395/80; 395/82; 395/88; 901/3
[58] Field of Search ............................. 395/80, 88, 82; 901/3

[56] References Cited

U.S. PATENT DOCUMENTS

| 4,685,067 | 8/1987 | French et al. | 395/80 |
| 4,697,239 | 9/1987 | Sicard et al. | 395/82 |
| 4,833,624 | 5/1989 | Kuwahara et al. | 364/132 |
| 4,998,206 | 3/1991 | Jones et al. | 364/468 |
| 5,161,101 | 11/1992 | Nishiyama et al. | 395/88 |
| 5,341,458 | 8/1994 | Kaneko et al. | 395/80 |
| 5,495,410 | 2/1996 | Graf | 395/90 |
| 5,524,253 | 6/1996 | Pham et al. | 395/800 |

*Primary Examiner*—Tariq R. Hafiz
*Attorney, Agent, or Firm*—McDermott, Will & Emery

[57] ABSTRACT

A program formation block extracts an operation factor which must be performed and the target work of the operation factor for each car type from a car-type classified operation registration file on the basis of a car-type number input from a car-type No. input block. The program formation block selects a manipulator capable of the extracted operation factor from an operation factor manipulator table, and extracts, from a manipulator individual program module, a program which the selected manipulator requires to perform the operation factor. Such processes are performed to all operation factors extracted from the car-type classified operation registration file to form a series of programs. Interlock information between manipulators is added to the series of programs to automatically generate teaching data.

9 Claims, 15 Drawing Sheets

FIG. 7

| FUNCTION \ WORK | FUEL | WASHER LIQUID | FUEL CAP | COOLING WATER | GLASS | REAR GLASS RUBBER | REAR SHEET | BATTERY | REAR SHEET FASTENING | SPARE TIRE | FRONT SHEET | HANDWHEEL | WASHER LIQUID CAP | FRONT GLASS RUBBER (UPPER) | RUBBER (SIDE) | TIER | FRONT DOOR | REAR DOOR | BATTERY HARNESS |
|---|---|---|---|---|---|---|---|---|---|---|---|---|---|---|---|---|---|---|---|
| SINGLE-HAND GRIPPING | O |  | O |  | O |  | O | O |  | O | O |  |  |  |  | O |  |  |  |
| DOUBLE-HAND GRIPPING |  |  |  |  |  |  |  |  |  |  |  |  |  |  |  |  |  |  |  |
| FITTING IN |  |  |  |  |  |  |  |  |  |  |  |  |  |  |  | O |  |  |  |
| HAMMERING INTO |  |  |  |  |  |  |  |  |  |  |  |  |  |  |  |  |  |  |  |
| THRUSTING | O | O | O | O |  |  | O |  |  | O | O |  |  |  |  |  |  |  |  |
| CONNECTOR COUPLING |  |  |  |  |  |  |  |  |  |  |  |  |  |  |  |  |  |  |  |
| THREAD FASTENING |  |  |  |  |  |  |  |  |  |  |  |  |  |  |  |  |  |  |  |
| TORQUE FASTENING |  |  |  |  |  |  |  |  |  | O |  |  |  |  |  | O |  |  |  |
| CAP FASTENING |  | O |  |  |  |  |  |  |  |  |  |  |  |  |  |  |  |  |  |
| HOLDING |  |  |  |  |  |  |  |  |  |  |  |  |  |  |  |  |  |  |  |
| PUSHING |  |  |  | O |  |  |  |  |  |  |  |  |  |  |  |  |  |  |  |
| HITTING |  |  |  |  |  |  |  |  |  |  |  |  |  |  |  |  |  |  |  |
| LEVELING |  |  |  |  |  |  |  |  |  |  |  |  |  |  |  |  |  |  |  |
| STRETCHING |  |  |  |  |  |  |  |  |  |  |  |  |  |  |  |  |  |  |  |
| SEALING |  |  |  |  | O |  |  |  |  |  |  |  |  |  |  |  |  |  |  |
| POSITIONING |  |  |  |  | O | O |  |  |  | O | O |  |  |  |  | O |  |  |  |

FIG. 8

OPERATION FACTOR CLASSIFIED COMMON
PROGRAM MODULE

| OPERATION FACTOR | WORK | PROGRAM MODULE | |
|---|---|---|---|
| SINGLE-HAND GLIPPING | FUEL TANK | • BEFORE APPROACH $\begin{pmatrix} -100, 50, 30, \\ 1, -5, 0 \end{pmatrix}$ <br> • APPROACH $\begin{pmatrix} -100, 10, 0, \\ 1, -5, 10 \end{pmatrix}$ <br> • GRIPPING    OUT Y001 | $(X, Y, Z, \theta x, \theta y, \theta z)$ |

FIG. 9

| OPERATION UNIT | FACILITY | ROBOT | | | | | | WORK SUPPLY APPARATUS | | | | | | | |
|---|---|---|---|---|---|---|---|---|---|---|---|---|---|---|---|
| | | VERTICAL ARTICULATED ROBOT | SUSPENDED TYPE ARTICULATED ROBOT | ARTICULATED ROBOT WITH TRAVELING SHAFT | Z-AXIS SCALER TYPE ROBOT | TIRE FASTENING ROBOT | GLASS STOCKING SINGLE-SHAFT ROBOT | DEDICATED PARTS FEEDER | ROLLER CONVEYOR | LIFTER | AGV | LEAK POSITIONING JIG | DEDICATED HAND | MANUAL THREAD FASTENER | VISUAL DEVICE |
| GRIPPING | SINGLE-HAND GRIPPING | ○ | | ○ | | ○ | ○ | | ○ | ○ | ○ | ○ | | | |
| | DOUBLE-HAND GRIPPING | | | | | | | | | | | | | | |
| INSERTION | FITTING TO EACH OTHER | | | | | | | | | | | | | | |
| | FITTING IN | ○ | | | | | | | | | | | ○ | | |
| | HAMMERING INTO | | | | | | | | | | | | | | |
| | THRUSTING | ○ | | | | | | | | | | | | | ○ |
| | CONNECTOR COUPLING | | | | | | | | | | | | | | |
| FASTENING | THREAD FASTENING | | | | | | | | | | | | | ○ | |
| | TORQUE FASTENING | ○ | | | ○ | | | | | | | | ○ | | |
| | CAP FASTENING | ○ | | | | | | | | | | | ○ | | |
| HOLDING | PRESSING | | | | | | | | | | | | | | |
| | PUSHING | ○ | | | | | | | | | | | | | |
| | HITTING | | | | | | | | | | | | | | |
| | LEVELING | | | | | | | | | | | | | | |
| | STRETCHING | | | | | | | | | | | | | | |
| | SEALING | | ○ | | | | | | | | | ○ | | | ○ |
| POSITIONING | | | | | | | | | | ○ | | ○ | | | |

FIG. 10

MANIPULATOR INDIVIDUAL
PROGRAM MODULE

| MANIPULATOR | OPERATION FACTOR | WORK | PROGRAM MODULE |
|---|---|---|---|
| #1 | SINNGLE-HAND GRIPPING | FUEL TANK | • MOVE P1 $\begin{pmatrix} 15, 20, 25, \\ 3, 6, 5 \end{pmatrix}$ <br> • MOVE P2 $\begin{pmatrix} 15, -20, -5, \\ 3, 6, 15 \end{pmatrix}$ <br> • OUT Y001 |
| | | | |

FIG. 11

CAR-TYPE CLASSIFIED OPERATION REGISTRATION FILE

| CAR-TYPE No. | OPERATION FACTOR | WORK |
|---|---|---|
| 10 | SINGLE-HAND GRIPPING<br>SINGLE-HAND GRIPPING<br>THRUSTING/INSERTING<br>FASTENING | FUEL TANK #2<br>FUEL CAP #2<br>FUEL TANK #2<br>FUEL CAP #2 |
| 11 | SINGLE-HAND GRIPPING<br>THRUSTING/INSERTING | FUEL TANK #1<br>FUEL TANK #1 |
|  |  |  |

FIG. 14

INSTRUMENT ATTACHMENT TIME CHART

| ACTUATOR \ TIME(S) | 10 | 20 | 30 | 40 | 50 | 60 | 70 | 80 | 90 |
|---|---|---|---|---|---|---|---|---|---|
| CR LEFT ARM | ATTACH DUCT MODULE | INSERT SDD (L) INTO SDG (L) | | GRIP DUCT MODULE | | | ATTACH SVD | | |
| CR RIGHT ARM | ATTACH DUCT MODULE | | INSERT SDD (R) INTO SDG (R) | TOOL CHANGE | VISUALLY DETECT FDD THREAD FASTENING | THREAD-FASTEN FDD (THREE POINTS) | | | |
| AR #2 | ATTACH SVG (FOUR POINTS) | | | TOOL CHANGE | ATTACH METER | ATTACH CLUSTER | | | |
| AR #1 | | INSPECT SVG ATTACHMENT | | | THREAD-FASTEN METER (TWO POINTS) | | THREAD-FASTEN CLUSTER (TWO POINTS) | | |

FIG. 15

INTERLOCK WORK TABLE

| AR#1 | AR#2 | CR |
|------|------|------|
| X001 | Y002 | — |
| X002 | — | Y001 |
| X003 | — | Y002 |
| Y001 | X002 | — |

TEACHING PROGRAM AUTOMATIC GENERATION APPARATUS

BACKGROUND OF THE INVENTION

1. Field of the Invention

The present invention relates to a teaching program automatic generation apparatus capable of automatically generating a teaching program for, e.g., a robot, with a simple operation.

2. Prior Art

Conventionally, in many cases, teaching for a robot is performed in such a manner that an operator operates a teaching pendant to teach a robot installed in a site. Although the teaching operation with the teaching pendant can be efficiently performed to a robot which performs a relatively simple operation, a long time is required to teach a robot which performs a complex operation, it is very difficult to efficiently teach such a robot.

In order to perform any improvement at all, a teaching operation without using a teaching pendant, i.e., a method in which an operator grips an arm of a robot and move it to automatically form teaching data, or a method in which teaching data for the robot is automatically formed by effectively using CAD data has been realized. In this manner, an attempt to make a teaching operation efficient has been performed.

However, especially, in an automobile production line, a large number of robots which respectively perform many types of operations are arranged in one line. In this state, in particular, when the large number of robots arranged in the line respectively perform different operations, teaching must be performed every robot. Even if the above method is used, improvement in efficiency is limited to a specific level.

3. Presumptive Art

Due to the above situation, there is proposed an apparatus in which flow production is not performed by a large number of robots arranged in a production line, but intensive production is performed by a small number of robots each having a plurality of functions. FIG. 6 is a view showing such a parts assembling apparatus in assembling for the instrument panel of an automobile.

As shown in FIG. 6, this parts assembling apparatus comprises automatic convey vehicles to be referred to as AGVs hereinafter) 3A to 3F for conveying parts serving as works on traveling tracks 2A, 2B and 2C arranged around an operation stage 1, a double-arm robot 4 arranged on the operation stage 1, and multi-spindle robots 5A and 5B.

The AGVs 3A to 3D are arranged only to convey parts, the AGVs 3E and 3F operate not only to the parts but also to vertically or horizontally slide the parts placed on the AGVs 3E and 3F as needed so as to assist the robots 4, 5A and 5B. The operations of the AGVs 3A to 3F and the operations of the robots 4, 5A, and 5B are integrally controlled by an integrated controller 6. Note that the double-arm robot 4 is controlled with a CR control panel 7, and the multi-spindle robots 5A and 5B are independently controlled by the AR control panel 8.

The double-arm robot 4 is a cooperative robot which cooperates with the AGVs 3E and 3F traveling on the traveling track 2C, and has a function for automatically switching an operation tool according to the contents of the operation. In addition, since the double-arm robot 4 has a visual sensor or force sensor, the double-arm robot 4 is designed to easily assemble a soft part which is easily elastically deformed by some force. The AGVs 3E and 3F are cooperative AGVs which cooperate with the cooperative double-arm robot 4.

In such a system, it is important how specific operations are respectively assigned to multifunctional robots 4, 5A, and 5B in a specific order.

SUMMARY OF THE INVENTION

The present invention has been made in consideration of the above background, and has as its object to provide a teaching program automatic generation apparatus capable of automatically generating an optimum teaching program with a simple operation.

In order to achieve the above object, the present invention provides a teaching program automatic generation apparatus comprising: target work specifying means for specifying a work serving as an operation target; a work classified operation registration file for storing operation contents required for each type of works; an operation content facility table for storing types of facilities capable of executing the operation contents; a facility individual program module for storing programs as modules for executing the operation contents for each of the facilities; facility program formation means for, on the basis of information of the work specified by the target work specifying means, loading operation contents required for the work from the work classified operation registration file, selecting facilities capable of executing the loaded operation contents from the operation content facility table, and extracting a program module for executing the loaded operation contents from the facility individual program module for each of the selected facilities to form series of programs for each of the facilities.

According to a preferable aspect of the present invention, the teaching program automatic generation apparatus further comprises a program automatic generation means for adding interlock information between facilities to the series of programs for each of the facilities formed by the facility program formation means to automatically generate teaching programs for each of the facilities.

Operation contents required for each type of works are stored in the work classified operation registration file in advance, types of facilities capable of executing the operation contents are stored in the operation content facility table in advance, operation factors arranged in time series for each manipulator are stored in an operation flow table in advance, interlock information between manipulators is stored in an interlock work table in advance. Under this setting, with only specifying a target work, teaching data for all the facilities required for operations for the work are formed. For this reason, the efficiency of the operations required for teaching can be considerably improved.

In the preferable aspect of the present invention, the teaching program automatic generation apparatus further comprises CAD teaching means for forming teaching data for each of facilities on the basis of the types of facilities capable of executing the operation contents stored in the operation content facility table to store the teaching data in the facility individual program module as programs set for each of the facilities.

In the preferable aspect of the present invention, the teaching program automatic generation apparatus further comprises operation content registration means for storing operation contents required for each type of works in the work classified operation registration file and storing the types of facilities capable of the operation contents in the operation content facility table.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a view showing an operation factor work table;

FIG. 8 is a view showing an operation factor classified common program module;

FIG. 9 is a view showing an operation factor manipulator table;

FIG. 10 is a view showing a manipulator individual program module;

FIG. 11 is a view showing a car-type classified operation registration file;

FIG. 14 is a time chart of operation flows; and

FIG. 15 is a view showing an interlock work table.

DESCRIPTION OF THE PREFERRED EMBODIMENT

An embodiment of the present invention will be described below with reference to the accompanying drawings.

Figure 1:
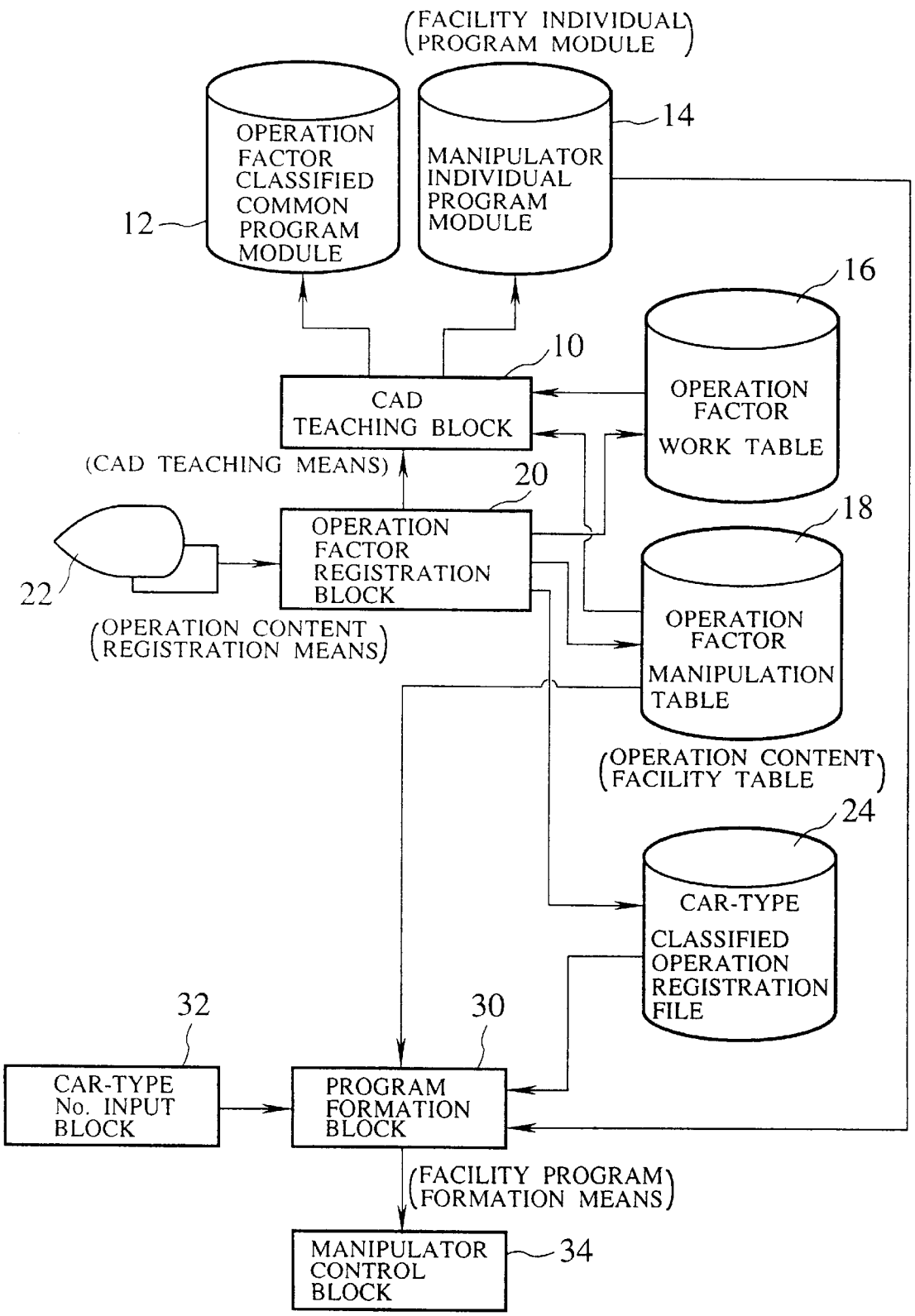
FIG. 1 is a schematic view showing the arrangement of a teaching program automatic generation apparatus according to an embodiment of the present invention.

FIG. 1 is a schematic view showing the arrangement of a teaching program automatic generation apparatus according to the present invention.

An operation factor common program module 12, a manipulator individual program module 14 serving as a facility individual program module, an operation factor work table 16, and an operation factor manipulator 18 serving as an operation content facility table are connected to a CAD teaching block 10. These modules and tables are stored in a storage device constituted by a RAM and the like. Although the details of the modules and the tables will be described later, the following data are stored in the storage device.

In the operation factor classified common program module 12, the relationship among an operation factor of a robot such as an operation factor that a work is gripped with a single hand, a target work of an operation such as a fuel tank or the like, and a program module in which coordinates for performing a predetermined operation to the target work are expressed is described.

The same, but classified for each manipulator, data as those described in the operation factor classified common program module 12 are stored in the manipulator individual program module 14.

In the operation factor work table 16, the relationship between an operation factor and a work, e.g., data that works to be gripped with a single hand are a fuel tank, a fuel cap, a glass, a rear sheet, and the like, is stored.

In the operation factor manipulator table 18, the relationship between an operation factor and a facility (robot or the like), e.g., data that an operation in which a work is gripped with a single hand can be performed by a vertical articulated robot, an articulated robot with a traveling shaft, a tire fixing robot, or the like, is stored.

The CAD teaching block 10 forms the operation factor classified common program module 12 and a manipulator individual program module 14 on the basis of the data stored in the operation factor work table 16.

In the operation factor classified common program module 12, for example, coordinates before approach, coordinates to be approached, an instruction of gripping, used when a fuel tank is operated with a single hand ,and the like are stored. In the manipulator individual program module 14, for example, coordinates and instructions used when the same operations as described above are performed are stored for each type of manipulators.

An input terminal 22, an operation factor work table 16, the operation factor manipulator table 18, and a car-type classified operation registration file 24 serving as a work classified operation registration file are connected to an operation factor registration block 20.

In the car-type classified operation registration file 24, the relationship between an operation factor performed for each car type and the target work of the operation factor, e.g., a series of operations in which, with respect to car-type number 10, a fuel tank #2 is gripped with a single hand, a fuel cap #2 is gripped with a single hand, the fuel cap #2 is thrust and inserted into the fuel tank, and the fuel cap #2 is fastened.

The operation factor registration block 20 forms, on the basis of input data from the input terminal 22, data to be stored in the operation factor work table 16, the operation factor manipulator table 18, and the car-type classified operation registration file 24. More specifically, all the tables and files stored in the operation factor work table 16, the operation factor manipulator table 18, and the car-type classified operation registration file 24 are data input from the input terminal 22.

A car-type No. input block 32 serving as a target work specifying means, the manipulator individual program module 14, the operation factor manipulator table 18, the car-type classified operation registration file 24, and a manipulator control block 34 are connected to a program formation block 30 which functions as a facility program formation means. A car-type number for extracting data related to a predetermined car type from the car-type classified operation registration file 24 is input from the car-type No. input block 32.

The program formation block 30 inputs an operation factor of a corresponding car type on the basis of a car-type number input from the car-type No. input block 32, selects a manipulator capable of performing the operation of the operation factor from the operation factor manipulator table 18, inputs a module related to a robot capable of performing the operation of the operation factor from the manipulator individual program module 14, and forms a teaching program for each robot in consideration of interlock information.

The manipulator control block 34 controls the operation of each robot on the basis of the teaching programs generated by the program formation block 30.

Figure 2:
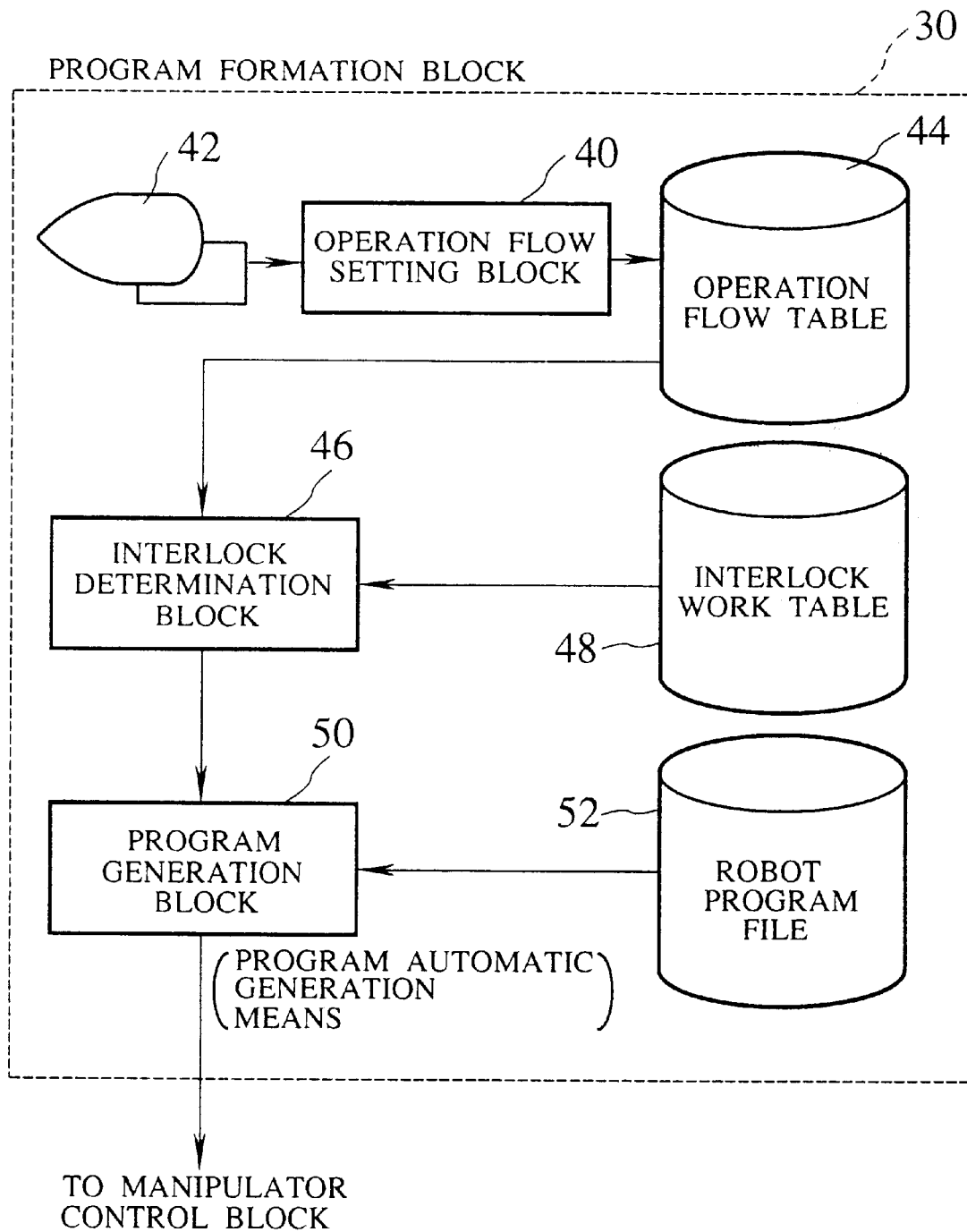
FIG. 2 is a block diagram showing the details of the arrangement of a program formation block.

FIG. 2 is a further detailed block diagram of a program formation block 30 shown in FIG. 1.

An input terminal 42 and an operation flow table 44 are connected to an operation flow setting block 40. Although a concrete example of the operation flow table will be described later, in short, the operation flow table is a table in which operation procedures of each robot are stored. The operation flow setting block 40 forms the operation flow table 44 on the basis of a indication from the input terminal 42.

The operation flow table 44, an interlock work table 48, and a program generation block 50 serving as a program automatic generation means are connected to an interlock determination block 46. The information related to interlocking between robots is stored in the interlock work table 48. The interlock determination block 46 extracts an operation flow of each robot from the operation flow table 44 to determine specific robots which are to be interlocked, thereby extracting information related to interlocking from the interlock work table 48.

A robot program file 52 is connected to the program generation block 50 which functions as a program automatic generation means. The program generation block 50 adds the information which is related to interlocking and extracted by the interlock determination block 46 to the program of each robot which is formed by connecting modules, thereby automatically generating a teaching program. The program generation block 50 stores the teaching program in the robot program file 52. In addition, the program generation block 50 sends the teaching program stored in the robot program file 52 to the manipulator control block 34.

The functions and roles of each block of the teaching program automatic generation apparatus of the present invention have been described above. The process steps of teaching program automatic generation according to this apparatus will be described in detail below with reference to the flow charts in FIGS. 3 and 5 and FIGS. 7 to 15.

Figure 3:
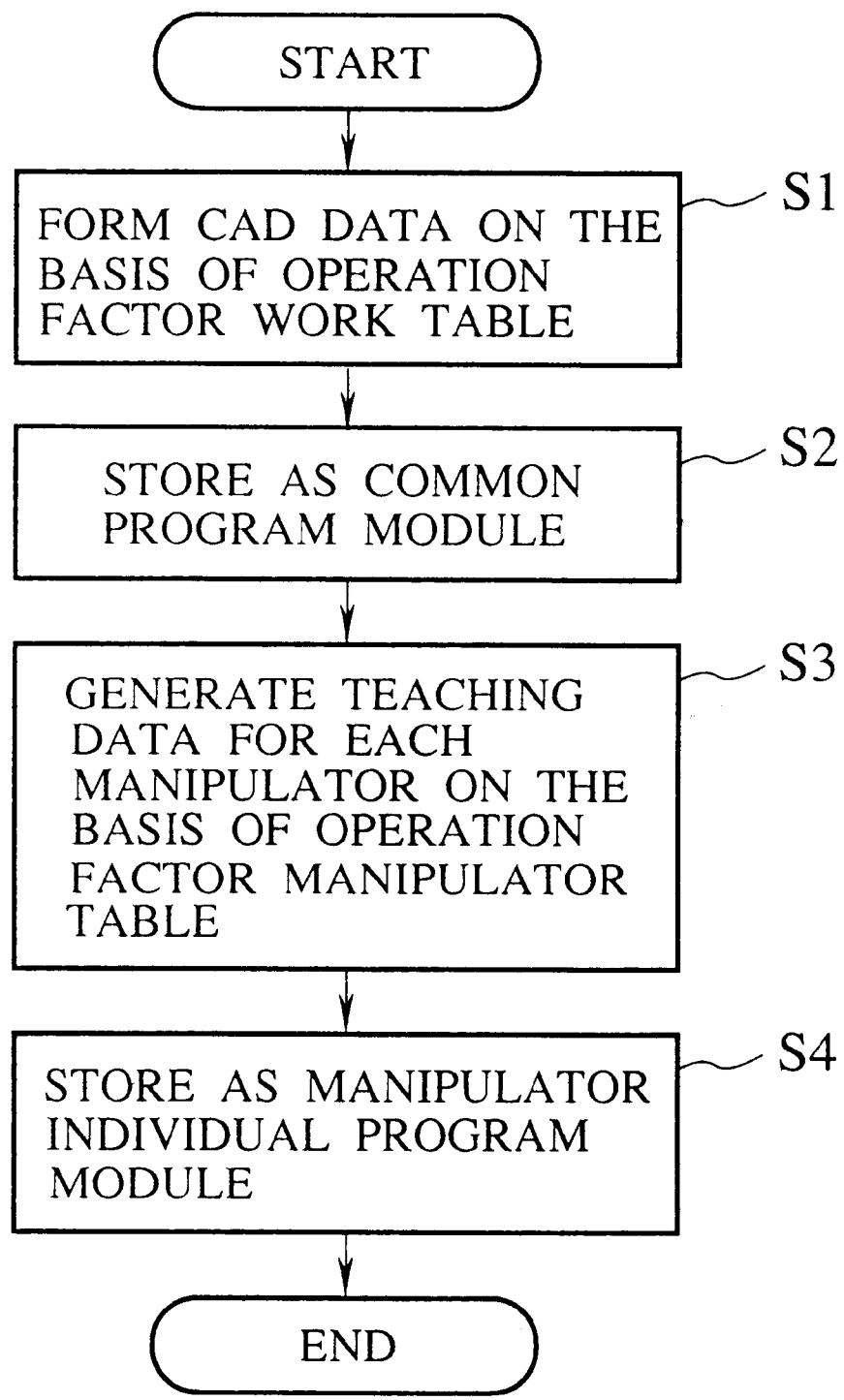
FIG. 3 is a flow chart of processes performed in a CAD teaching block.

Processes performed by the CAD teaching block 10 will be described with reference to FIG. 3.

S1

The CAD teaching block 10 extracts data from the operation factor work table 16 in which the relationship between operation factors and works shown in FIG. 7 are stored, and forms CAD data on the basis of the data. As shown in FIG. 7, data that target works subjected to single-hand gripping as an operation factor are a fuel tank, a fuel cap, a glass, a rear sheet, a battery, a spare tire, a front sheet, and tire, data that target works subjected to thrusting are a fuel tank, window washer liquid, a fuel cap, cooling water, a rear sheet, a tire, a spare tire, and front sheet, and data that target works subjected to torque fixing are a tire and a spare tire are stored in the operation factor work table 16. The target works for each operation factor are output from the CAD teaching block 10, thereby generating CAD data.

S2

Since the CAD data generated by the manner described above is a common data to all the car types and all the manipulators, the CAD data is stored in the operation factor common program module 12 as a common program. More specifically, for example, as shown in FIG. 8, a program module constituted by, for example, coordinates before approach, coordinates to be approached, and an instruction of gripping for gripping the fuel tank with a single hand is stored as a program of each operation factor for each target work, more specifically in this case, as a program for gripping the fuel cap with a single hand.

S3, S4

The CAD teaching block 10 generates teaching data for each manipulator on the basis of the operation factor manipulator table 18 in which the relationship between the operation factors and facilities (robots and the like) shown in FIG. 9 is stored. The CAD teaching block 10 stores the generated teaching data in the manipulator individual program module 14 as a manipulator individual program shown in FIG. 10. More specifically, a program related to a common operation factor of each facility is stored as a program module for each operation factor.

Figure 4:
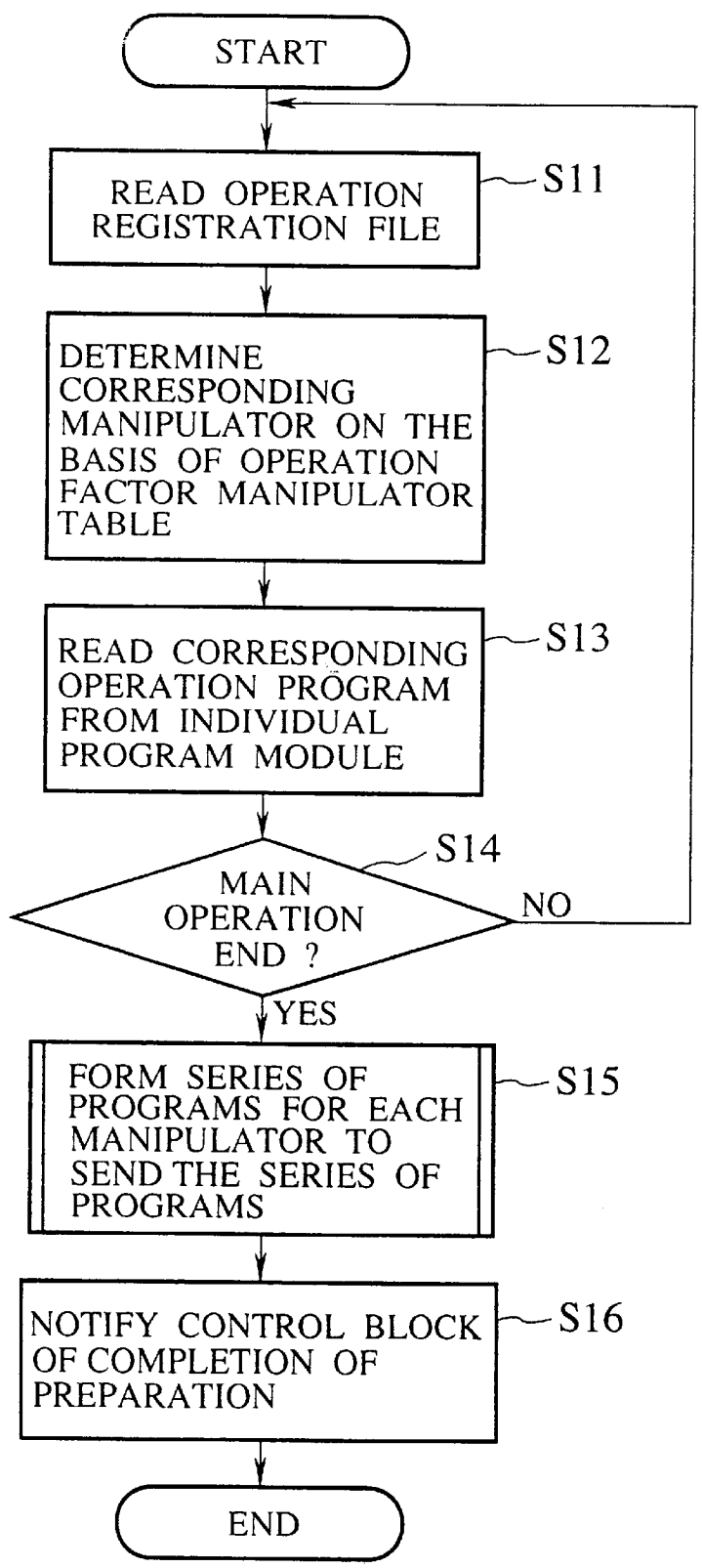
FIG. 4 is a flow chart of processes performed in a program formation block.

Processes performed by the program formation block 30 will be described below with reference to FIG. 4.

S11

On the basis of a car-type number input from the car-type No. input block 32, the program formation block 30 extracts an operation factor corresponding to the car-type number in the manner shown in FIG. 11 from the car-type classified operation registration file 24 in which the relationship between operation factors performed for each type of cars and the target works of the operation factors.

For example, in such a case that the operation registration file is stored in the manner shown in FIG. 11, when an input car-type number is 11, operation factors such as single-hand gripping of the fuel tank #1 and thrusting and inserting of the fuel tank #1 are extracted.

S12

The program formation block 30 selects a manipulator capable of performing of an operation of the operation factor extracted in the above step from the operation factor manipulator table 18 in which the operation factors and facilities (robots and the like) are stored in the manner shown in FIG. 9.

For example, the operation factors such as singlehand gripping of the fuel tank #1 and thrusting/inserting of the fuel tank #1 are extracted in the above step. For this reason, as is apparent from FIG. 9, since the single-hand gripping can be performed by robots such as a vertical articulated robot, an articulated robot with a traveling shaft, a tire fixing robot, and a glass stocking single-shaft robot, these robots, i.e., manipulators are selected. Similarly, since the thrusting/inserting can be performed by only the vertical articulated robot, finally, the vertical articulated robot is selected with respect to the above operation factors.

S13

The program formation block 30 selects a program module related to the manipulator selected in the above step from the manipulator individual program module 14 in which operation factor individual program modules of each manipulator are stored in the manner shown in FIG. 10.

In the above example, a program module for performing operations that the vertical articulated robot grips the fuel tank #1 with a single hand and thrusts/inserts the fuel tank #1 is selected.

S14

The processes in S11 to S13 are repeatedly performed until all the operations stored in the car-type classified operation registration file related to the input car-type number are completed.

S15, S16

Upon completion of all the processes in the above steps, a series of programs are generated for each manipulator. Therefore, after that, the program formation block 30 sends the programs to the manipulator control block 34 to notify the manipulator control block 34 of completion of preparation.

Figure 5:
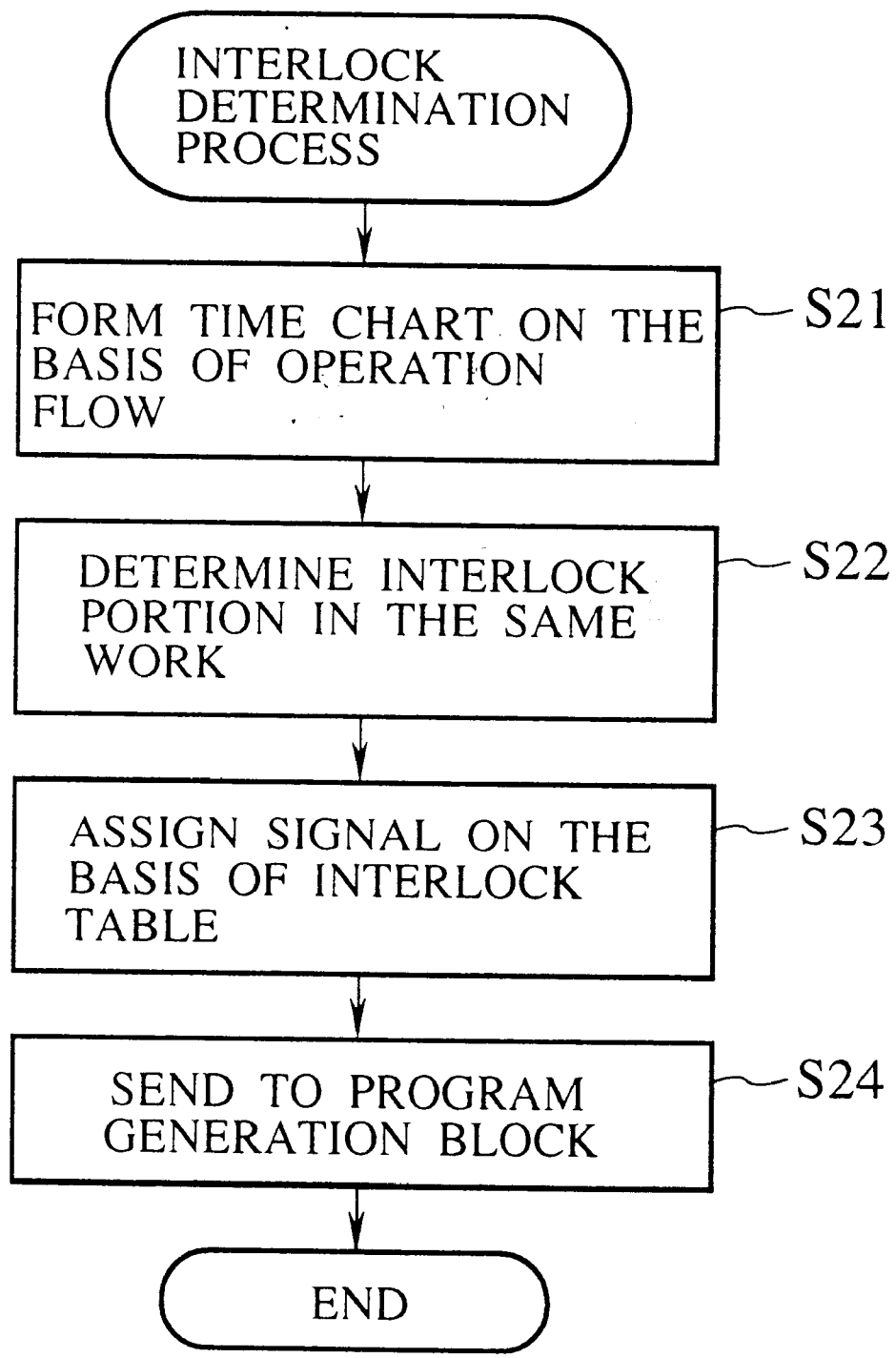
FIG. 5 is a flow chart of processes performed in an interlock determination block.
Figure 6:
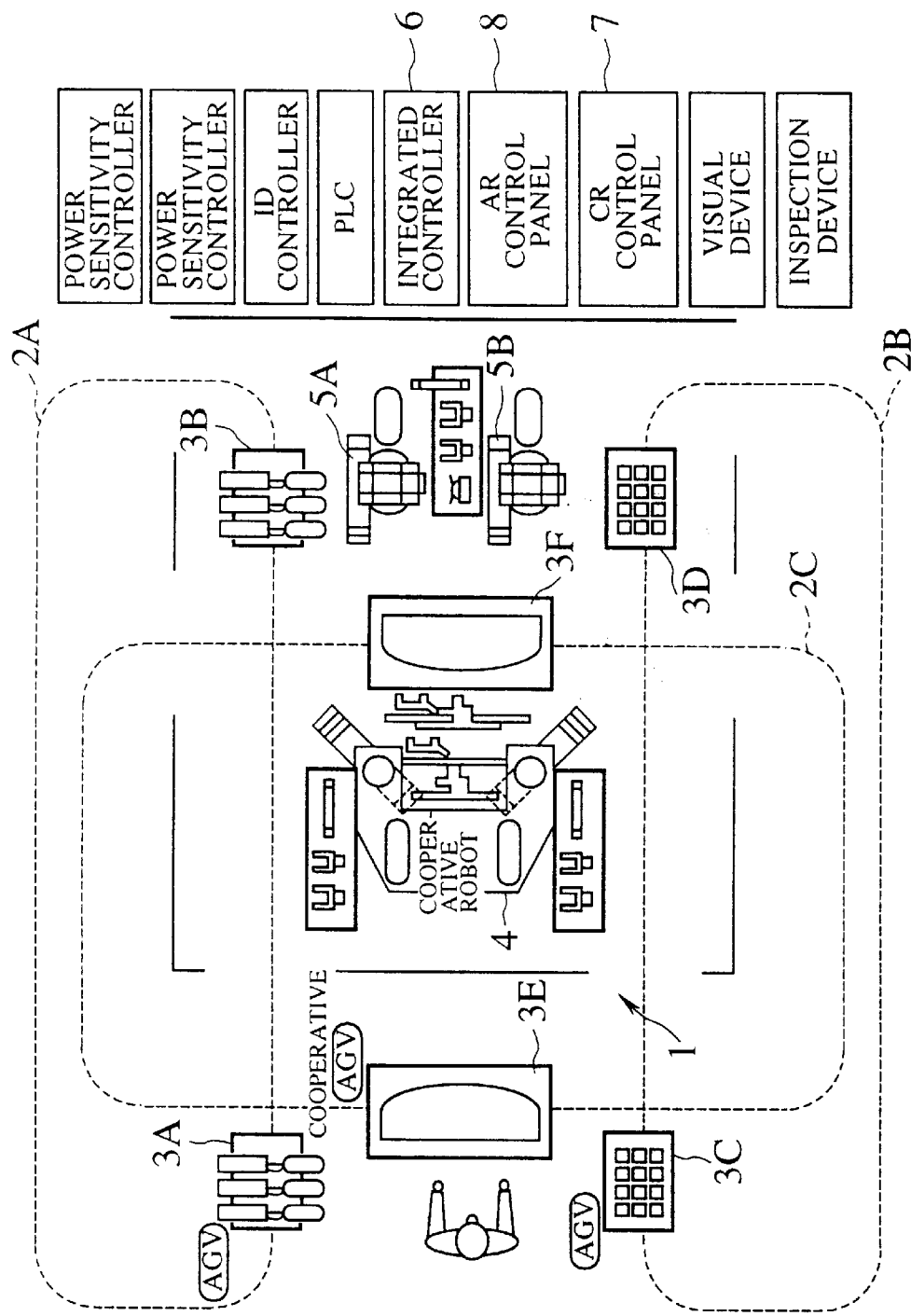
FIG. 6 is a view showing an arrangement of a parts assembling apparatus to which the present invention is applied.
Figure 12:
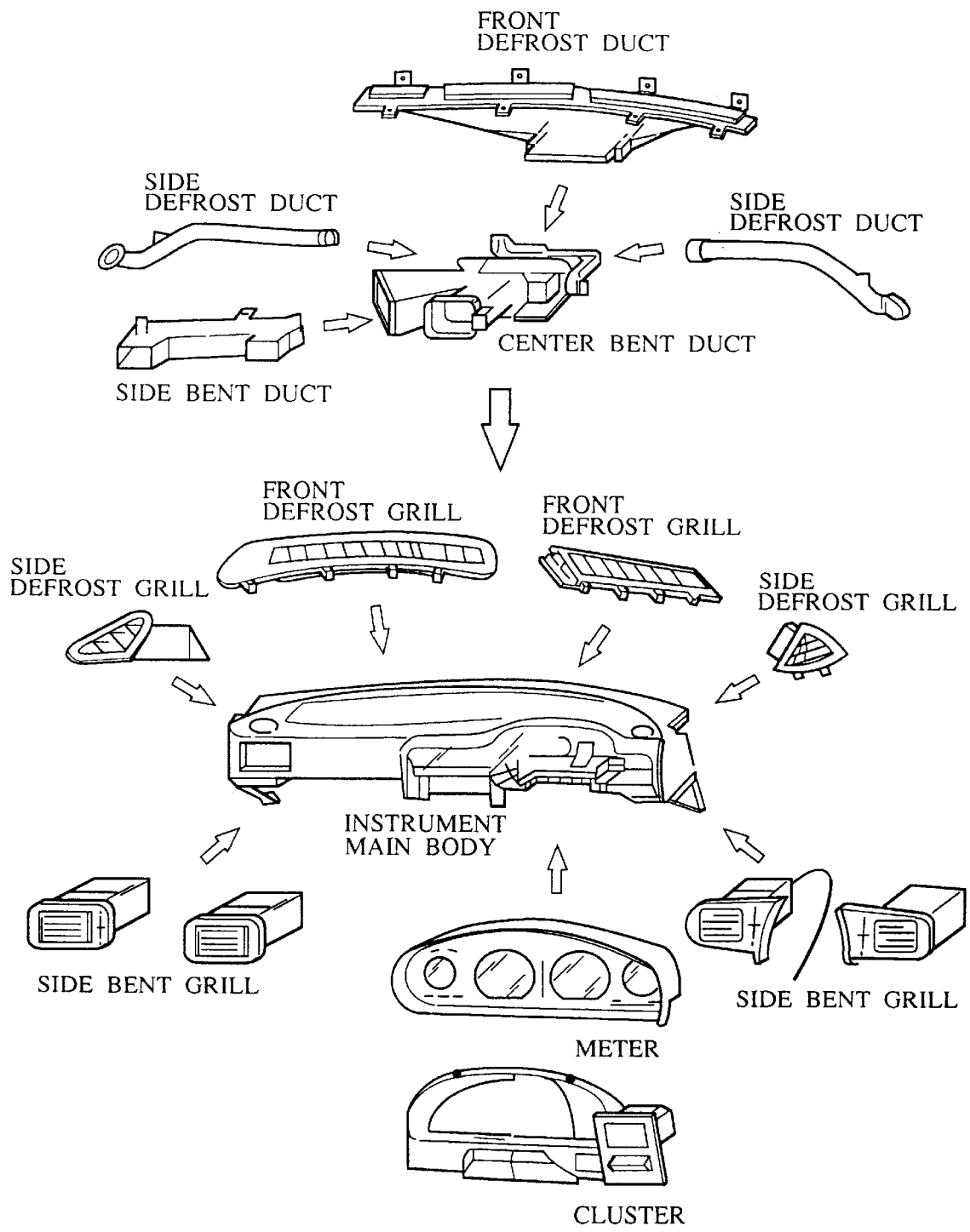
FIG. 12 is a view showing parts of an instrument panel.

The subroutine flow chart of the process performed in step S15 is shown in FIG. 5. On the basis of this flow chart, the operation of an interlock determination block 46 arranged in the program formation block 30 will be described using assembling for an instrument panel as an example. FIG. 12 is an exploded view of the instrument panel.

S21

Figure 13:
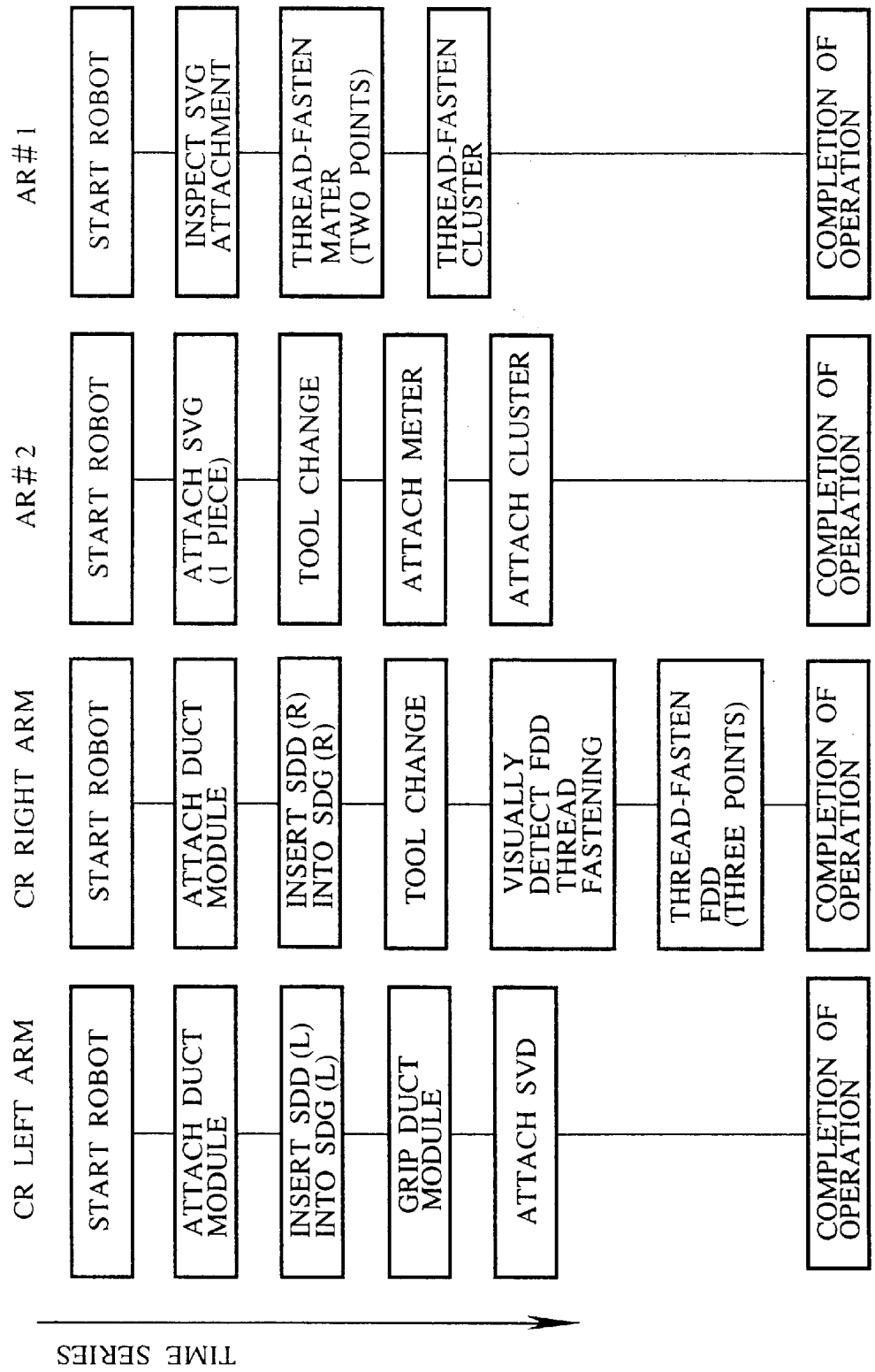
FIG. 13 is a chart showing an operation flow table.

The operation flow setting block 40 forms time charts for each type of manipulators shown in FIG. 14 on the basis of operation factors arranged in time series for each manipulator type and stored in the operation flow table 44 as shown in, e.g., FIG. 13.

S22

The interlock determination block 46 determines an interlock portion in the same work on the basis of the time chart formed by the operation flow setting block 40. In the time chart in FIG. 14, since robots AR#2 and AR#1 perform operations to the same work, the interlock determination block 46 determines that both the robots should be interlocked.

S23

The interlock determination block 46 extracts a corresponding interlock information from the interlock work table 48 in which interlock information shown in FIG. 15 is stored. In the above example, the interlock information between robots AR#2 and AR#1 as shown in FIG. 15 are extracted.

S24

The interlock determination block 46 outputs the extracted interlock information to the program generation block 50, and the program generation block 50 forms a series of teaching programs for each manipulator in consideration of the interlock information and stores the series of teaching programs in the robot program file 52.

In this manner, in the teaching program automatic generation apparatus according to the present invention, required data are input to the operation factor work table 16, the operation factor manipulator table 18, the car-type classified operation registration file 24, and the operation flow table 44 in advance, and interlock information is input to the interlock work table 48. In this case, when only a car-type number is input, teaching of operations which must be performed for each car type are automatically performed for each manipulator with adding the interlock information. As a result, the teaching operation can be performed within a very short time.

It should be understood that many modifications and adaptations of the invention will become apparent to those skilled in the art and it is intended to encompass such obvious modifications and changes in the scope of the claims appended hereto.

What is claimed is:

1. A teaching program automatic generation apparatus for a plurality of facilities comprising:
   a car-type classified operation registration file for storing, for each car-type, sequential operation contents performed and works each corresponding to each of the sequential operation contents;
   an operation content facility table for identifying all the facilities for every operation content necessary to be executed for any one of the car-types wherein at least two facilities are identifiable as being capable for performing at least one of the operation contents;
   an operation content-work table for identifying all the operation contents for each of all the works:
   a facility individual program module connected to both the operation content-facility table and the operation content-work table for, after selecting one facility out of at least the two facilities, storing, for respective facilities, a program module for each operation contents with respect to each of the corresponding works;
   a car-type specifying unit for specifying a car-type serving as an operation target; and
   a facility program formation unit for, on the basis of information of the car-type specified by said car-type specifying means, loading the sequential operation contents and the corresponding works required for the specified car-type from said car-type classified operation registration file, and extracting, for each of the respective facilities, program modules for executing the loaded sequential operation contents from said facility individual program module to form series of programs for each of the facilities.

2. The teaching program automatic generation apparatus according to claim 1, further comprising:
   a program automatic generation means for adding interlock information between facilities to the series of programs for each of the facilities formed by said facility program formation means to automatically generate teaching programs for each of the facilities.

3. The teaching program automatic generation apparatus according to claim 1, further comprising:
   CAD teaching means for forming teaching data for said at least one facility capable of executing each of the plurality of operation contents stored in said operation content facility table to store the teaching data in said facility individual program module as programs set for said at least one facility.

4. The teaching program automatic generation apparatus as claimed in claim 1, wherein the selection of one facility is made in such a way that the same facility operates on a plurality of operation contents associated with the same work.

5. An automatic teaching program generation apparatus to generate programs for control of a plurality of facilities operable for a car assembly site, said generation apparatus comprising:
   an operation registration file for storing sequential operation contents required to perform an assembly process;
   an operation content-facility table for identifying all of the facilities for each of all the operation contents, wherein at least two facilities are capable for performing at least one of the operation contents;
   an operation content-work table for identifying operation contents for each of all the target works;
   a facility individual program module for after selecting one facility out of at least the two facilities specifying for respective facilities a program module for each operation content with respect to each of the corresponding works; and
   a facility program formation unit connected to both the operation content-facility table and the operation content-work table to load the specified program module to each of the selected facilities.

6. The automatic teaching program generation apparatus according to claim 5, wherein a predetermined number of car-types are assembled,
   the operation registration file further stores the operation contents for each of the car-types, and
   a car-type specifying unit specifies a car-type and subsequently generates a signal indicative thereof to the facility program formation unit.

7. A teaching program automatic generation apparatus, for a plurality of facilities comprising:

a car-type classified operation registration file for storing, for each car-type, sequential operation contents performed and target works each corresponding to each of the sequential operation contents;

an operation content-facility table for identifying a facility for each of all of the operation contents necessary to be executed for all of the car-types wherein at least two facilities are capable for performing at least one of the operation contents;

an operation content-work table for identifying operation contents for each of all the target works;

a facility individual program module for, after selecting one facility out of at least the two facilities, storing, for respective facilities, a program module for each operation content with respect to each of the corresponding works;

a car-type specifying unit for specifying a car-type serving as an operation target; and a facility program formation unit for, on the basis of information of the car-type specified by said car-type specifying means, loading the sequential operation contents and the corresponding target works required for the specified car-type from said car-type classified operation registration file, and extracting, for each of the respective facilities, program modules for executing the loaded sequential operation contents from said facility individual program module to form series of programs for each of the facilities.

8. The teaching program automatic generation apparatus as claimed in claim 7, wherein the selection of one facility is made in such a way that the same facility operates on a plurality of operation contents associated with the same work.

9. The teaching program automatic generation apparatus as claimed in claim 8, said operation content-work table is a two dimensional table for identifying at least one operation content with respect to each of works associated with said operation.

* * * * *